United States Patent [19]

Jones et al.

[11] Patent Number: 4,740,851
[45] Date of Patent: Apr. 26, 1988

[54] DISK DRIVE WITH SPICULE MEMBER

[75] Inventors: David E. Jones; Randall C. Bauck, both of Layton, Utah

[73] Assignee: Iomega Corporation, Roy, Utah

[21] Appl. No.: 854,419

[22] Filed: Apr. 21, 1986

[51] Int. Cl.$^4$ .............. G11B 5/012; G11B 5/016; G11B 5/55; G11B 21/08
[52] U.S. Cl. .................... 360/97; 360/86; 360/99; 360/106
[58] Field of Search ............ 369/261, 270, 271, 282, 369/75.1, 77.1, 77.2, 258; 360/86, 97, 99, 105, 106, 104, 133

[56] References Cited

U.S. PATENT DOCUMENTS

| | | | |
|---|---|---|---|
| 3,772,665 | 11/1973 | Hertrich | 340/174.1 |
| 4,001,888 | 1/1977 | Morgan | 360/99 |
| 4,151,573 | 4/1979 | Tandon et al. | 360/105 |
| 4,414,591 | 11/1983 | Wenner | 360/97 |
| 4,423,449 | 12/1983 | Haseqawa | 360/99 |
| 4,502,083 | 2/1985 | Bauck | 360/99 |
| 4,603,362 | 7/1986 | Sendelweck | 360/97 |
| 4,641,209 | 2/1987 | Smith | 360/86 |

Primary Examiner—John H. Wolff
Assistant Examiner—Benjamin E. Urcia
Attorney, Agent, or Firm—Woodcock Washburn Kurtz Mackiewicz & Norris

[57] ABSTRACT

A device for aligning a disk contained in a cartridge with a motor and transducer of a disk drive is disclosed. A record disk contained within a rigid apertured cartridge is inserted into a disk drive for use with that disk drive. Insertion of the cartridge into the disk drive causes engagement of a reference surface of the cartridge with a reference surface of a spicule member contained within the disk drive. The spicule member carries the transducer and drive spindle of the disk drive. The spicule member also contains a clamping device which ensures proper engagement of the cartridge reference surface and the spicule reference surface. The result is the proper alignment between the disk contained in the rigid cartridge and the transducer and motor spindle carried by the spicule member.

15 Claims, 7 Drawing Sheets

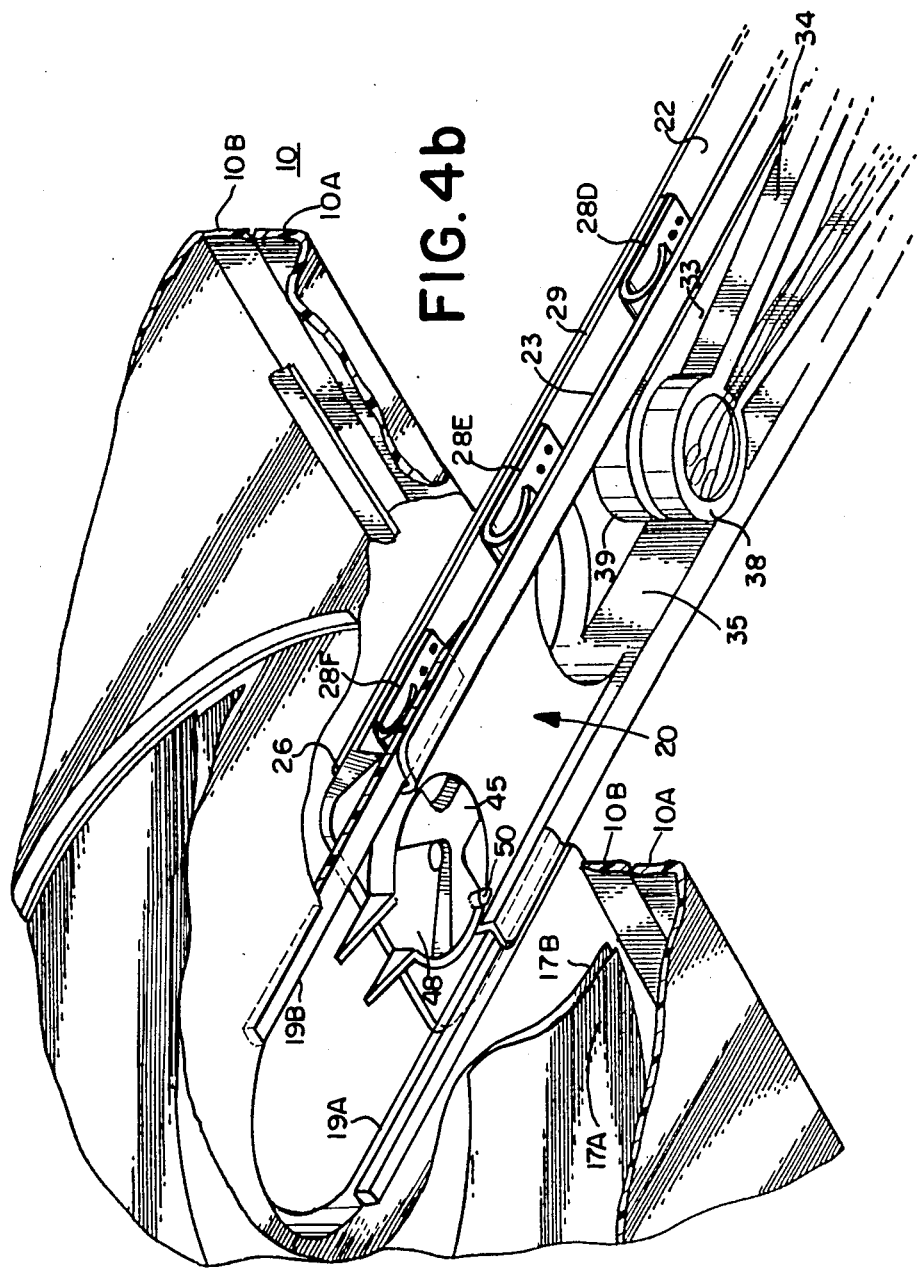

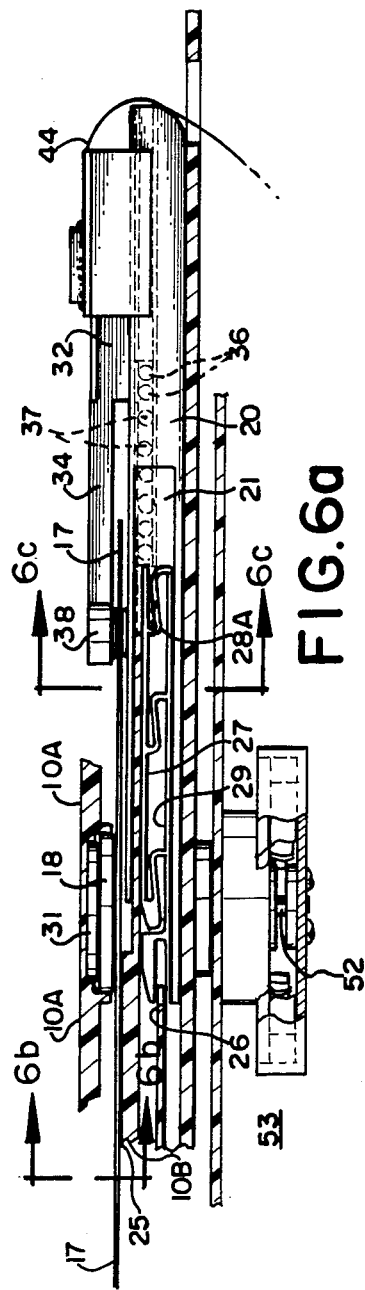
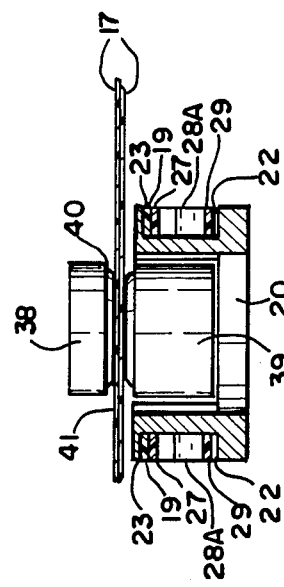
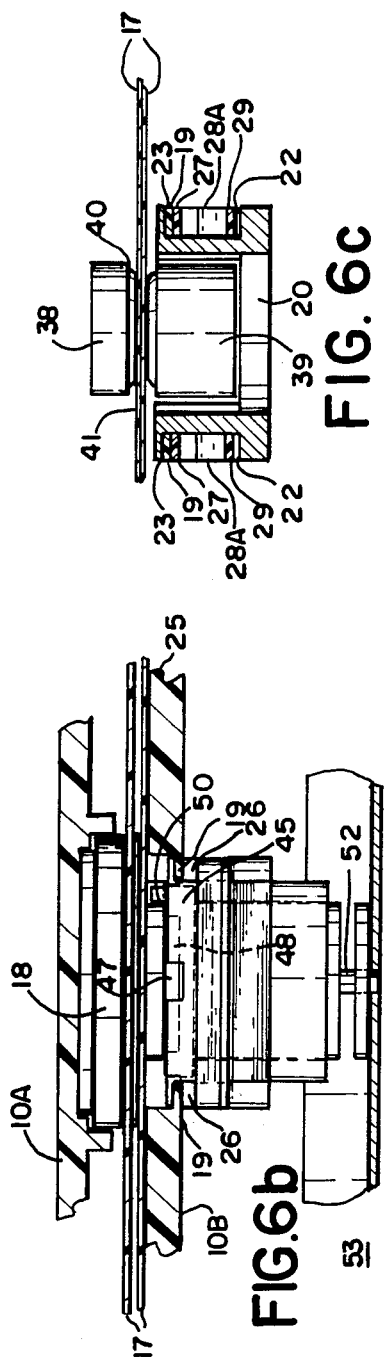

DISK DRIVE WITH SPICULE MEMBER

RELALATED APPLICATIONS

This application is related by subject matter to the following commonly assigned co-pending applications, all of which are incorporated herein by reference: application Ser. Nos. 854,342, 854,333, 854,130, and 854,292, all filed Apr. 21, 1986.

BACKGROUND OF THE INVENTION

This invention relates to record disk drives. More specifically, this invention relates to a disk drive device which engages a reference surface in a disk cartridge and aligns the disk contained therein with the drive's transducer and motor spindle when the cartridge is inserted into the drive.

It is well known that the spatial alignment of a disk with the transducer used to store and retrieve data to and from that disk is of critical importance. When a disk is made a permanent part of the disk drive there is relatively little problem in precisely obtaining this alignment. However, when such a disk is made portable relative to the drive, various problems are encountered in balancing the need for a portable, non-integral disk with the importance of a proper disk to transducer alignment when the drive is in operation. One solution has been to have the transducer and/or motor held in a noninterfering position while the disk is being inserted into the drive. After the disk cartridge is properly inserted, the transducer and/or motor is returned to its operating position. See for example U.S. Pat. Nos. 4,502,083—Bauck et al.; 3,772,665 —Hertrich. The problem is amplified when attempting to access two read/write surfaces simultaneously, and the corresponding solutions have been more complex and susceptible to imprecision. See for example U.S. Pat. Nos. 3,990,111—Elliot; 4,001,888—Morgan; 4,151,573—Tandon et al.; 4,414,591—Wenner; and 4,423,449—Hasegawa.

In all of the above cited references, the degrees of freedom of movement between the disk surface and the transducer surface are greater than that required for the read/write (i.e., retrieve/store) function itself. For example, in typical prior art the transducer has a component of movement in a normal direction relative to the disk; however, movement in a radial direction relative to the disk is all that is required for the read/write operation. This extra degree of freedom introduces greater possibilities of imprecision in aligning the disk with the transducer and/or motor spindle.

SUMMARY OF THE INVENTION

In accordance with this invention, a spicule member is mounted to the drive housing. The spicule member has a first reference surface against which a second reference surface in the disk cartridge is held. The spicule member contains a clamping element which insures intimate contact between the two reference surfaces whenever the cartridge is within the drive. One or more transducers are slideably mounted on the spicule member such that the transducer surfaces are movable radially towards and away from the inserted disk but not movable in a direction normal to the surface of the disk. In this way, the transducer surfaces are critically aligned with the disk upon insertion of the cartridge without having relative movement between the disk and transducer in a direction normal to the disks.

It is an object of this invention to provide a recording device of improved precision and reliability.

It is a further object of this invention to provide an improved apparatus for alignment of a disk contained in a cartridge with the transducer and drive means of a disk drive.

It is a still further object of this invention to utilize a single actuator for moving one or more transducers into read/write relationship with one or more record disks.

The above and other objects and features of the present invention will become better understood from the following more detailed description and appended claims.

BRIEF DESCRIPTION OF THE DRAWINGS

FIG. 4b shows the use of "U" shaped clamping members made according to a more preferred embodiment of this invention.

FIG. 6a is a cross sectional view of a spicule member made according to this invention in engagement with a floppy disk cartridge made for use with this invention.

FIG. 6b is a cross sectional view of a motor spindle made according to this invention in alignment and engagement with the hub of a floppy disk cartridge made for use with this invention.

FIG. 6c is a cross sectional view of a transducer pair made according to this invention in read/write relationship with a disk pair made for use with this invention.

DESCRIPTION OF THE PREFERRED EMBODIMENT

General Description

This invention is directed to a device for aligning a disk contained within a cartridge with the transducer and drive means of a disk drive. Although the present invention is described below in relation to the rotation and alignment of a floppy disk pair contained in a rigid cartridge, it is not so limited. The cartridge has an opening which exposes the hub of the floppy disk pair and the floppy disk pair itself to the spicule member of this invention. The cartridge is enclosed by a movable protective cover or shutter. When in the open position, this cover allows access to the disk hub and the floppy disk pair through the opening in the cartridge.

The cartridge enters the disk drive through a slot in the front face of the disk drive. Upon entering the disk drive, a mechanism contained within the disk drive moves the protective cover to the open position as fully disclosed, in co-pending application Ser. No. 854,130 filed Apr. 21, 1986. The spicule member of this invention guides the movement of the cartridge and assures proper spacial alignment between the floppy disk pair contained within the cartridge and the transducer and motor spindle mounted to the spicule member. The spicule member also contains a clamping mechanism which holds and flattens the rigid cartridge in the region of the aperture.

Detailed Description

Figure 1:
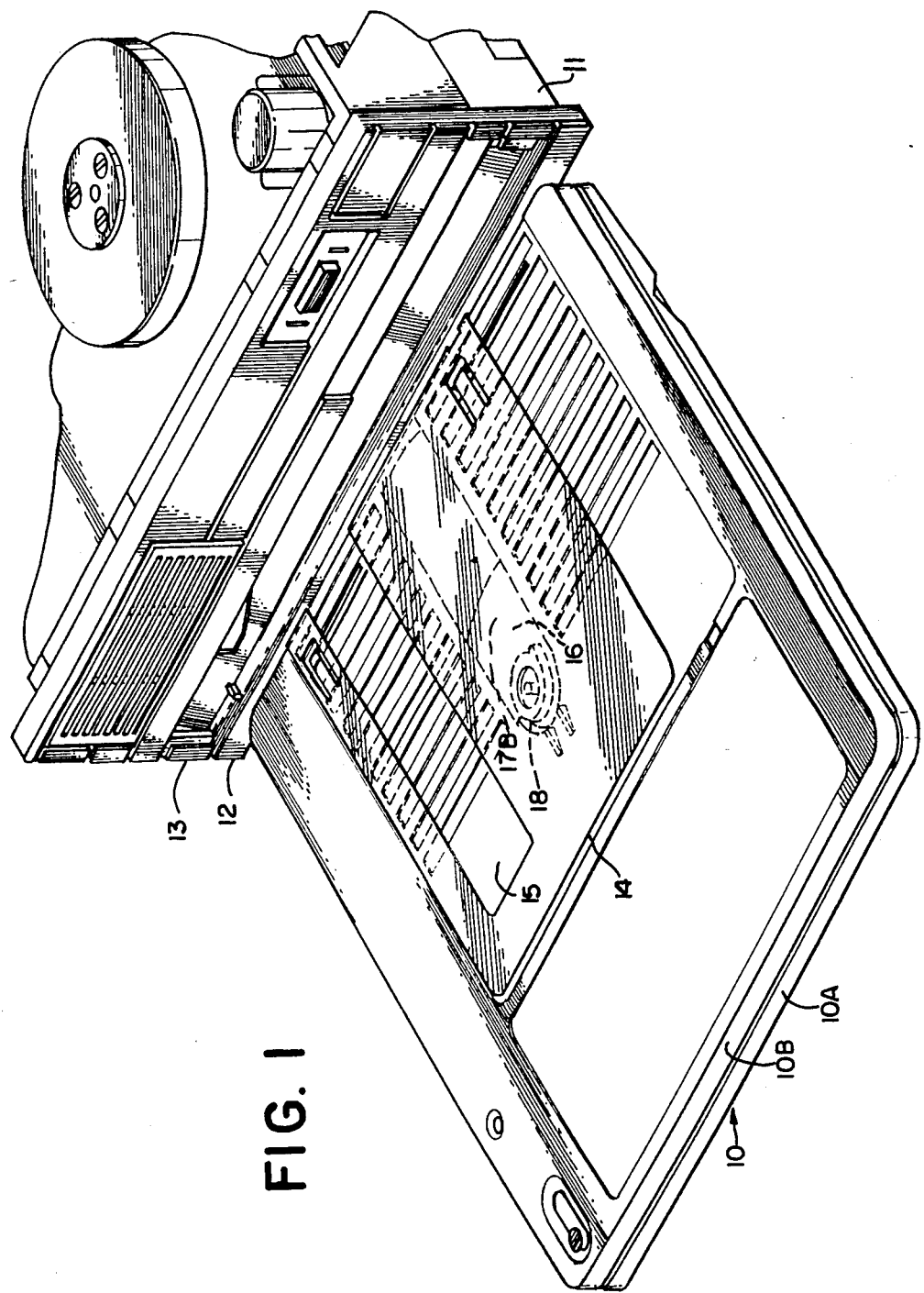
FIG. 1 is a top perspective view of a floppy disk cartridge made for use with this invention as it is about to enter a disk drive containing the spicule member of this invention.

Referring to FIG. 1, floppy disk pair 17A/17B is contained within a rigid cartridge 10. Cartridge 10 is shown in a top perspective as it is about to enter the housing of disk drive 11 through slot 12. Disk drive 11 contains the spicule member of this invention. Slot 12 is normally closed by a hinged cover 13 which is moved to an open position as cartridge 10 is inserted into the drive.

Cartridge 10 is partially enclosed by a slidable cover 14. This cover has an offset aperture 15 in its top surface. When cartridge 10 is inserted into slot 12, cover 14 is moved to the right such that opening 15 exposes the central portion of cartridge 10 to the spicule member. In the preferred embodiment of this invention, shutter 14 operates according to the disclosure contained in the co-pending application Ser. No. 854,130.

Figure 2:
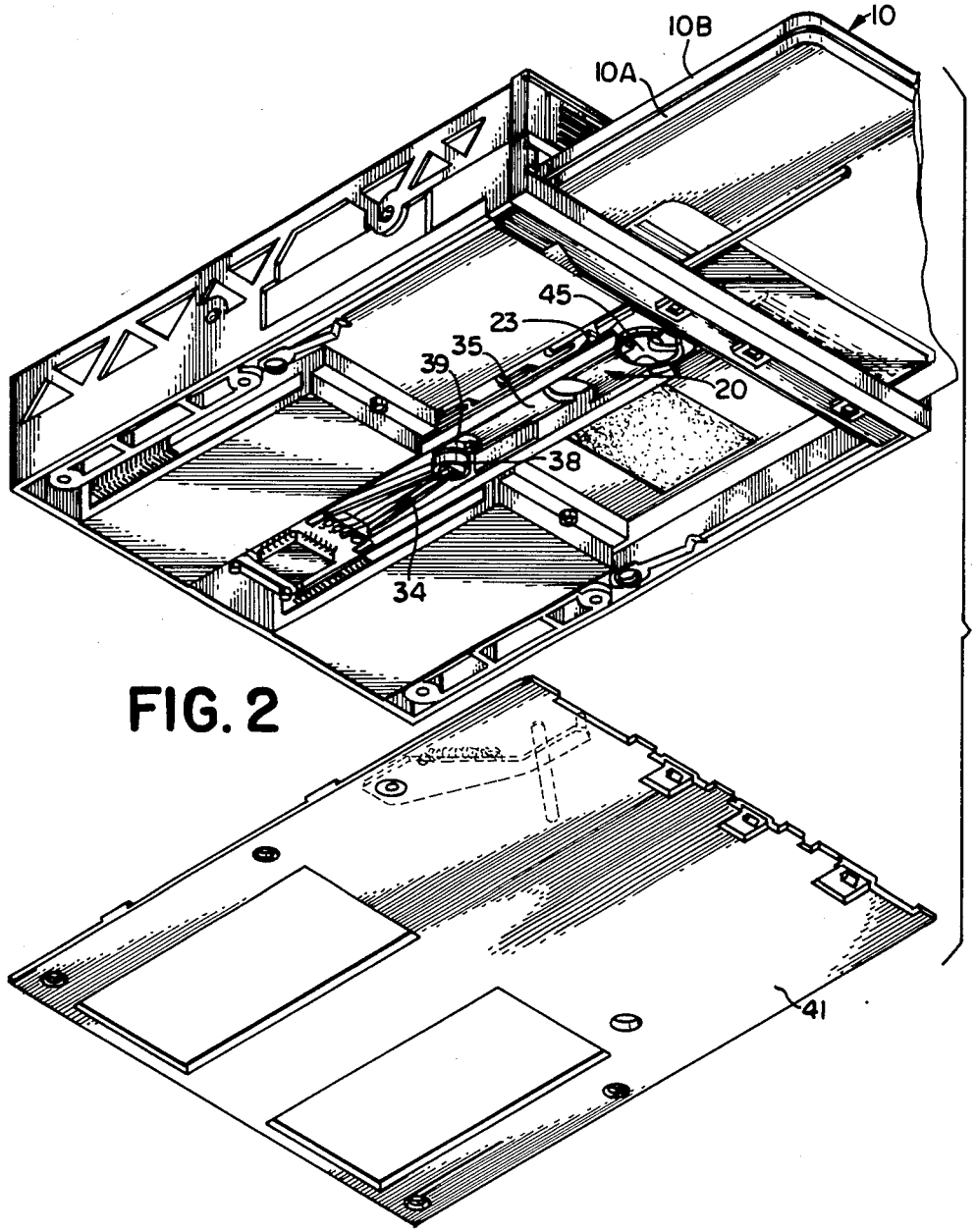
FIG. 2 is an exploded bottom perspective view of a disk drive containing a spicule member made according to this invention and having a cartridge made for use with this invention partially inserted therein.

When cover 14 is in the open position aperture 15 is coincidental with aperture 16 in the cartridge top. This aperture is revealed in FIG. 1, through cover 14, by way of the dash lines running radially from the center of the cartridge. Access to disk pair 17A/17B and disk hub 18, which are revealed by dash lines in FIG. 1, is achieved through opening 16 when cartridge 10 is inserted into slot 12 and when cover 14 is in the open position. In FIG. 2, cartridge 10 is partially inserted into disk drive 11 through slot 12, as seen in a bottom perspective view in which the base cover 41 of disk drive 11 has been exploded away to reveal the lower portion of spicule member 20. In this view the end of drive spindle 45 and transducer pair 38 and 39 are revealed. Spicule reference surface 23 is also revealed in this view.

Figure 3:
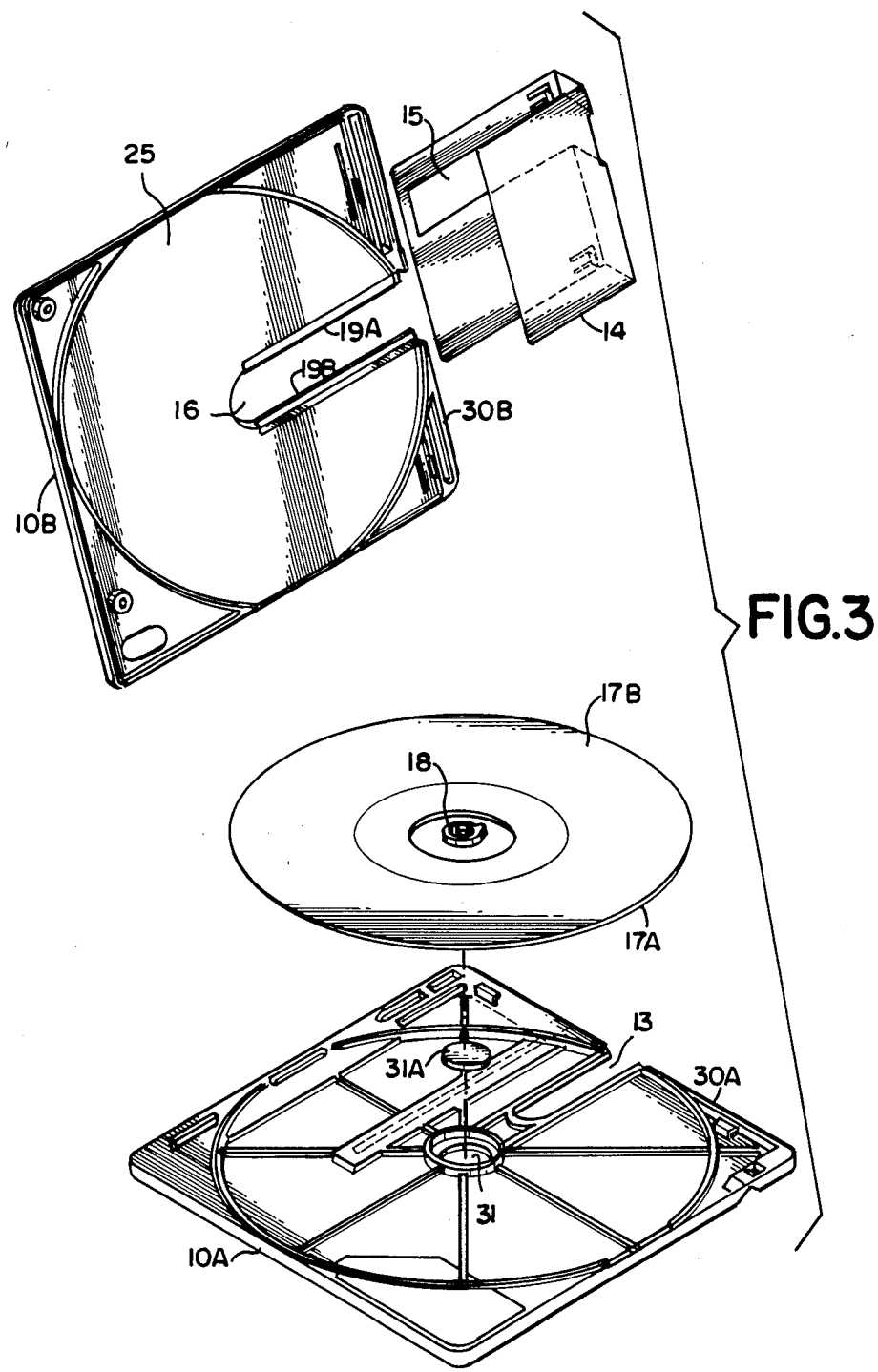
FIG. 3 is an exploded perspective view of a disk cartridge made for use with this invention which shows the interior surfaces of the cartridge, the disk pair contained within the cartridge, and the slidable protective cover for the cartridge.

FIG. 3 is an exploded perspective view of cartridge 10 showing: the inside surface of cartridge top 10B, the inside surface of cartridge bottom 10A, disk pair 17A/17B axially spaced from their normal position in cartridge bottom 10A, resilient member 31A axially spaced from its normal position in dish like opening 31, and shutter 14 radially spaced from its normal enclosing position relative to cartridge 10. In assembled form, disk pair 17A/17B is contained within the chamber formed by the joining of cartridge bottom 10A and cartridge top 10B, and shutter 14 is slideably mounted to the cartridge. The cartridge bottom 10A has an opening 13 extending from its leading edge 30A to a point short of the center of the cartridge. The cartridge top 10B contains a surface 25 on its inside face which substantially inscribes a circular area therein. Cartridge top 10B has an opening 16 which is coincidental with the opening in cartridge bottom 10A and extends from the leading edge 30B of cartridge top 10B to a point beyond the center of the cartridge. A pair of rails 19A and 19B extend into opening 16 in cartridge top 10B from the edge of the opening. Rails 19A and 19B are made integral with surface 25 and provide the following features: (1) any external stress applied to these rails is transmitted to surface 25 in the region of opening 16, and (2) the distance between the surface of rails 19 and surface 25 is fixed at a precise predetermined value. In the preferred embodiment of this invention, these features are achieved by forming surface 25 and rails 19 from a single mold. In the most preferred embodiment of this invention, the Bernoulli surface 25 and the reference surfaces of rails 19 are formed from the same side of a single mold. In this way, an integral relationship exists between reference rails 19 and surface 25. As such, any warping or deformation of Bernoulli surface 25 results in a similar warping or deformation of rails 19A and 19B. Conversely, any flattening stress applied to rails 19A and 19B concomitantly flattens Bernoulli surface 25 in the region of aperture 16.

The lower surface of disk hub 18 sits in a dishlike opening 31 in cartridge bottom 10A. The center of opening 31 is substantially in line with the centerline of opening 16 in cartridge top 10B when the cartridge is assembled. Between the lower surface of disk hub 18 and dishlike opening 31 is a resilient member 31A. When assembled, this member exerts a constant force on the disk hub which urges the outer surface of disk pair 17 towards surface 25. This resilient member can be an elastomeric disk, a dome shaped spring, or any other device which serves to insure juxtaposition between the outer surface of disk pair 17 and surface 25 as described more fully hereinafter and in co-pending application Ser. No. 854,333 filed Apr. 21, 1986. In the most preferred embodiment of this invention, the resilient member is a dome shape spring as disclosed in co-pending application Ser. No. 854,333 filed Apr. 21, 1986.

Figure 4A:
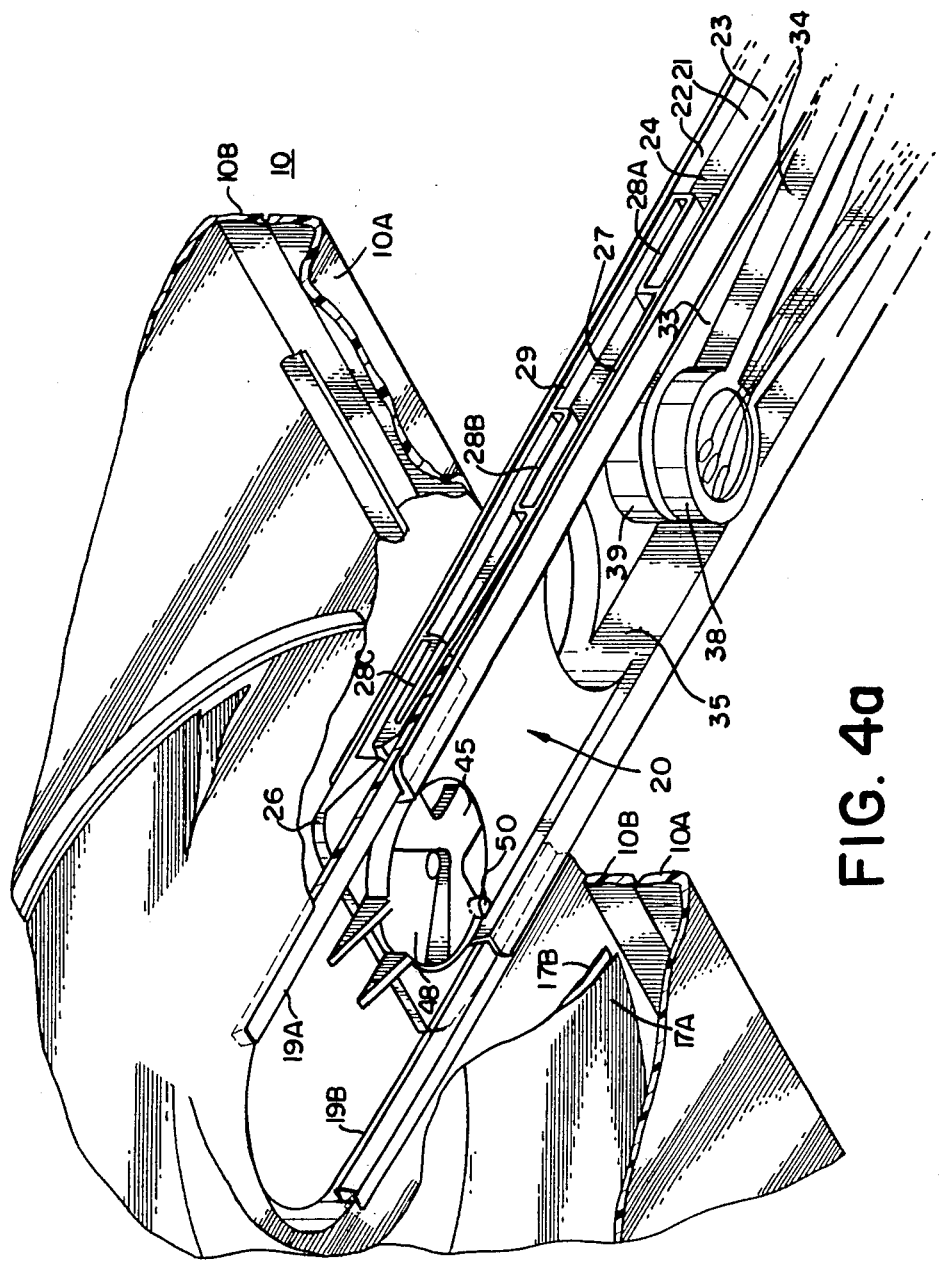
FIG. 4a is a cut away perspective view from below showing the spicule member of this invention isolated from the remainder of the disk drive and partially engaged with a cartridge made for use with this invention. This Figure shows the use of "S" shaped clamping members made according to this invention.
Figure 5:
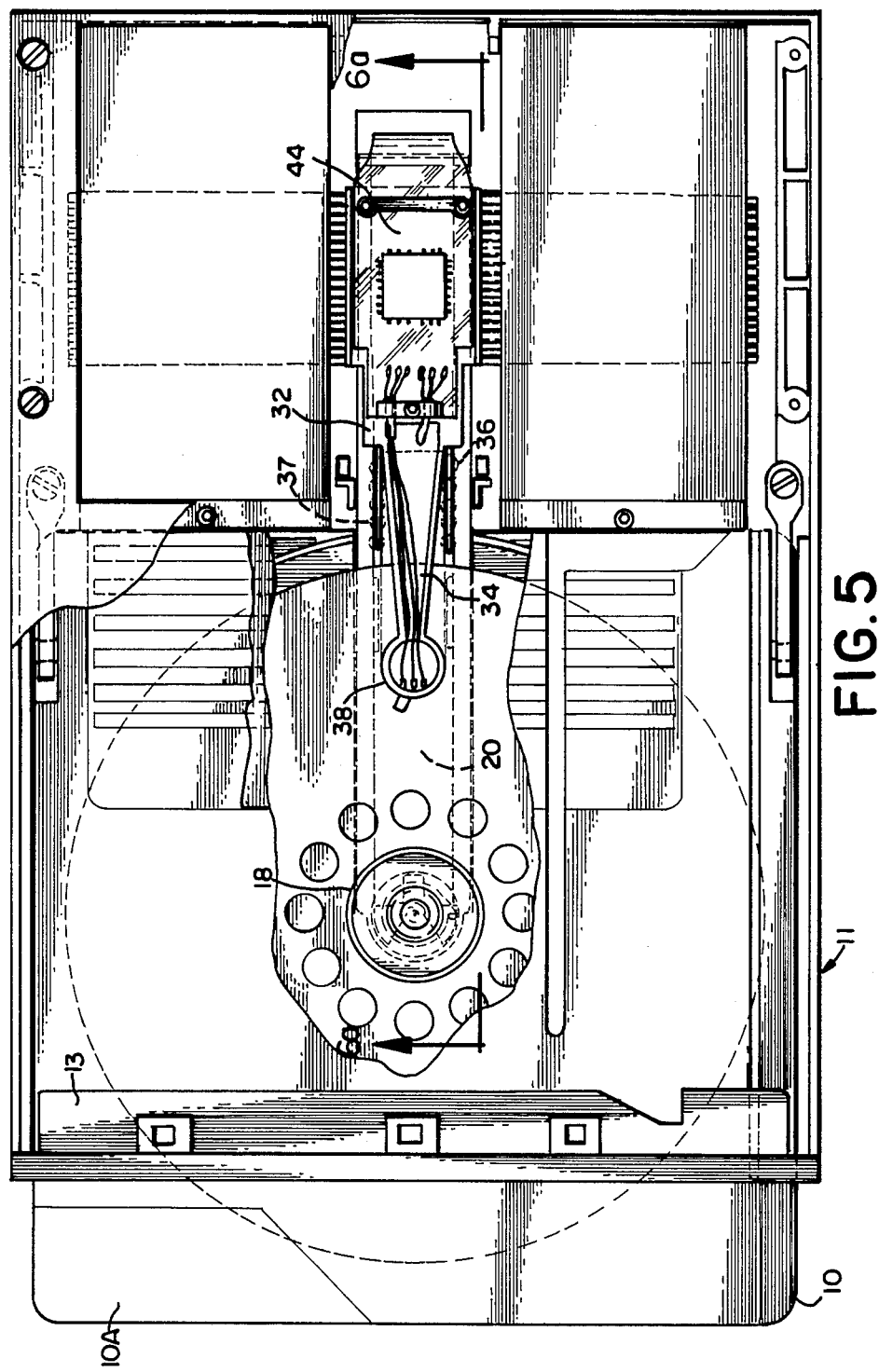
FIG. 5 is a cut away plan view from below showing a spicule member made according to this invention in engagement with a floppy disk cartridge made for use with this invention.

Referring to FIG. 4a, cartridge 10 of this invention is seen in partial engagement with spicule member 20 of this invention according to a first embodiment of this invention. FIG. 4a shows spicule member 20 isolated from disk drive 11 and in perspective view from below as it engages cartridge 10, which is shown in a cut away perspective view from below. It should be noted that in this view disk hub 18 and a portion of disk pair 17 are not shown so that the engagement of cartridge 10 with spicule member 20 can be more clearly illustrated. Spicule member 20 is called such because it serves as a backbone for two of the major components of the disk drive and it carries the disk cartridge in the region where the read/write function takes place. Both sides of spicule member 20 contain a slot 21 running substantially the entire length of the member. Slot 21 is defined by a top surface 22, a lower surface 23, and an inside surface 24. Slot 21 is of substantially the same width in the plane of surface 23 as the cartridge reference rails 19A, 19B.

A clamping member is comprised of a wedge shaped leading edge 26 and two sets of parallel rails which are connected to the leading edge and are enclosed by slot 21 as shown in FIG. 4a. The lower rail 27 sits on but is not attached to the lower surface 23 of slot 21. Top rail 29 is fixed or molded to the upper surface 22 of slot 21. In this embodiment of the present invention, three plastic "S" shaped resilient members 28A, 28B, and 28C are connected to the lower surface of top rail 29 and carry bottom rail 27 such that it is urged against lower surface 23. Resilient member 28C is formed to continue the wedge angle of leading edge 26, but is spaced from the leading edge. In this way, leading edge 26 directs cartridge reference rails 19A and 19B into the gap between the bottom rail 27 and the spicule reference surface 23 when cartridge 10 is inserted into drive 11. As the cartridge is inserted into drive 11, cartridge reference rails 19A and 19B enter into slot 21 and displace bottom rail 27 in an upward direction. Resilient members 28A, 28B, and 28C exert a downward force on rail 27, which transmits this force to rails 19A and 19B, thereby holding rails 19A and 19B within slot 21 and against spicule reference surface 23. While use of the resilient "S" shaped members described above has met with some success, it has been discovered that the plastic "S" shape may undergo fatigue failure after extensive use. In order to overcome this difficulty, a more preferred embodiment of this invention has been developed. In this more preferred embodiment, a plurality of metal "U" shaped resilient members are used in place of the plastic "S" shaped members. As shown in FIG. 4b, three "U" shaped clamping members 28D, 28E, and 28F are disposed between reference surface 23 and upper rail 29. The "U" shaped members are connected to the lower surface of top rail 29 and engage the reference surface 23 so as to exert a downward force thereagainst. Insertion of reference rails 19A and 19B of cartridge 10 between reference surface 23 and "U" shaped member 28D-28F causes an upward deflection of the "U" shaped members. Clamping members 28D through 28F resist this upper displacement and clamp the reference rails into slot 21. It is preferred that the resilient "U" shaped clamping members be formed of a sheet metal which is resistant to fatigue failure. It should be noted that in this embodiment lower rail 27 is not included. It has been found that warping of rails 19A and 19B usually occurs in a single deflection or contour, as opposed to a series of smaller undulations. As a result, the three discrete points of compression provided by members 28D, 28E, and 28F will generally provide sufficient flattening of the rails.

In the preferred embodiment of this invention, cartridge reference rails 19A and 19B are formed to be integral with surface 25 contained within cartridge 10. As such, any deformation or warping which is present in surface 25 when the cartridge is not within the disk drive is corrected by the stress exerted on rails 19A and 19B when the cartridge is inserted in disk drive 11. The clamping and flattening action of rail 27 or clamping members 28B-28F on cartridge reference rails 19A and 19B holds Bernoulli surface 25 flat and at a precise distance relative the spicule member 20. In particular, it will be appreciated by those skilled in the art that the distance between the lower surface of drive spindle 45 and Bernoulli surface 25 will be precisely fixed when cartridge 10 is fully inserted into the disk drive. This is achieved according to the practice of this invention by mounting drive spindle 45 to spicule member 20 such that the lower surface of the drive spindle is held in a fixed plane relative to the spicule member. In particular, the surface of drive spindle 45 is held in a plane a precise distance from the plane of reference surface 23. And since the clamping members 28A-28C or 28D-28F of this invention insure that Bernoulli surface 25 is held in a precise plane relative to the spicule member, the distance between the lower surface of drive spindle 45 and Bernoulli surface 25 is maintained at a precise value when cartridge 10 is inserted into the disk drive. As fully revealed in co-pending application Ser. No. 854,333, resilient member 31A causes the upper surface of disk hub 18 to be in intimate contact with the lower surface of drive spindle 45 when cartridge 10 is fully inserted within the disk drive. This intimate contact between the lower surface of drive spindle 45 and the upper surface of disk hub 18 in turn insures a precise spacial relationship between disk pair 17A/17B and Bernoulli surface 25 during rotation of the disk pair by drive spindle 45. As fully revealed in co-pending application Ser. No. 854,333 filed Apr. 21, 1986, juxtaposing disk 17A a precise distance from Bernoulli surface 25 is of critical importance in achieving proper stabilization of the disk pair. In addition, the spacial relationship between the disk pair 17A/17B and transducer pair 38/39 is also maintained by this invention. This invention achieves the objective of precise alignment between the disk pair and the Bernoulli surface, and the disk pair and the transducers, while maintaining the desirous portability of the floppy disk cartridge. It will also be appreciated by those skilled in the art that this precise relationship will be attained after extensive use of both the cartridge and the disk drive. This is so because of the following features possessed by this invention: (1) any warping or deformation of cartridge 10 which may occur after time will be corrected in the critical region by the flattening action of the "S" or "U" shape resilient members of this invention; and (2) because of the non-frictional coupling between spindle 45 and disk hub 18, as disclosed in co-pending application Ser. No. 854,333 filed Apr. 21, 1986, the precise distance established by the mating of the lower surface of drive spindle 45 and the upper surface of disk hub 18 is maintained over long periods of time since there is only minimal frictional engagement between these surfaces and consequently very low expected rates of wear.

Referring now to FIGS. 4a, 4b, 5, and 6a-6c, support arm 32 is slideably mounted to spicule member 20 such that it is fixed in a plane parallel to the spicule reference surface 23 but is movable along the length of spicule member 20. Support arm 32 is comprised of an upper arm 33 and a lower arm 34. Upper arm 33 rides in a channel 35 in spicule member 10. Upper arm 33 contains a groove (not shown) in both of the surfaces adjacent to the inside surfaces of channel 35. This groove is connected coaxially with a groove 36 (FIG. 6a) in the inside surfaces of channel 35 by a series of ball bearings 37 or some similar slidable connection which insures that the two grooves remain coaxial. The center line of groove 36 is parallel to reference surface 23. Transducers 38 and 39 are therefore fixed in a plane parallel to reference surface 23. As a result, transducer heads 40 and 41 (FIG. 6c) are fixed within disk drive 11 in the proper alignment with disks 17 when cartridge 10 is inserted into disk drive 11 as disclosed heretofore.

In the preferred embodiment of this invention, transducer heads 40 and 41 are substantially opposed and able to read and write data to and from the magnetic disks 17A and 17B simultaneously. Heads 40 and 41 share a common actuator 44 which moves support arm 32 radially towards and away from the magnetic disk pair 17A/17B. This actuator is a standard servo type actuator which is well-known in the art and not discussed in detail in this specification. The center of drive spindle 45 is mounted colinearly with the centerline of spicule member 20. Drive spindle 45 is rotatably mounted to spicule member 20 for coaxial rotation by the drive shaft 52 of drive motor 53. In addition, transducers 38 and 39 are mounted on support arms 33 and 34 such that the centers of transducer heads 40 and 41 are movable at a fixed distance from reference surface 23 in the plane which is perpendicular to reference surface 23 and which contains the center line of spicule member 20. In this way, transducers 40 and 41 move exactly radially towards and radially away from the disk pair 17A/17B when cartridge reference rails 19A and 19B are properly engaged by the spicule member and when the centers of the disks are concentric with drive spindle 45. Concentricity between disks 17 and drive spindle 45 may be achieved by mounting disks 17 concentrically on disk hub 18 and utilizing the coupling device disclosed in co-pending application Ser. No. 854,333 filed Apr. 21, 1986 to couple spindle 45 to disk hub 18.

While particular embodiments of the invention have been shown and described, modifications are within the spirit and scope of this invention. The appended claims, therefore, cover all such modifications.

What is claimed is:

1. A disk drive device for writing and reading data to and from a record disk contained in a rigid cartridge, said disk drive having therein a housing with two sidewalls defining the length of the housing and an endwall defining the width of the housing, said endwall having a cartridge access opening therein, said disk drive comprising:
   (a) a spicule member mounted within said housing between said sidewalls, said spicule member having a leading edge adjacent said cartridge access opening, the width of said spicule member being less than the width of said cartridge;
   (b) said cartridge having a transducer access opening and a cartridge reference surface adjacent said transducer access opening;
   (c) a drive spindle mounted to said spicule for rotating said disk;
   (d) said spiculer having a slot running along the length thereof for engaging the cartridge reference surface and guiding the movement of said cartridge into said disk drive, said slot including a spicule reference surface;
   (e) a transducer slideably mounted to said spicule such that said transducer is movable substantially only in a plane parallel to the disk when the cartridge is inserted in the disk drive; and
   (f) means for holding said cartridge reference surface against said spicule reference surface when said cartridge is inserted in the disk drive such that said cartridge is properly positioned with respect to said transducer in the region of said transducer access opening.

2. The disk drive as recited in claim 1 wherein said means for holding comprises:
   (a) said slot being a three sided slot, one of said sides comprising said spicule reference surface and a second of said sides being in opposed and spaced relation to said spicule reference surface;
   (b) resilient means connected to said second of said sides for resiliently urging said cartridge reference surface into contact with said spicule reference surface of said slot.

3. The disk drive recited in claim 2 wherein said resilient means comprises a rail formed to fit within said slot and a plurality of "S" shaped members, one end of each said "S" shaped members being attached to said second surface of said slot, the other end of each said "S" shaped member being attached to said rail.

4. The disk drive recited in claim 2 wherein said resilient means comprises a plurality of "U" shaped members disposed between said second surface and said spicule reference surface.

5. The disk drive recited in claim 3 wherein said leading edge of said spicule member comprises a tapered end of said rail adjacent said opening in said disk drive, said tapered end of said rail forming an opening between the end of said rail and said spicule reference surface for receiving the cartridge reference surface.

6. A disk drive as recited in claim 1 further comprising:
   (a) mounting means for slideably mounting said transducer to said spicule member, said mounting means having a support arm which carries said transducer;
   (b) said spicule member having a groove running parallel to said spicule reference surface; and
   (c) bearing means for slideably bearing said support arm for movement along said groove.

7. A disk drive as recited in claim 6 wherein:
   (a) said support arm has a groove therein, said groove running parallel to a surface of said support arm and to said spicule member groove; and
   (b) said bearing means comprises a plurality of ball bearings connecting said support arm groove to said spicule member groove.

8. A disk drive for writing and reading data to and from a disk contained in an apertured cartridge having a cartridge reference surface, said disk drive comprising:
   (a) a drive housing having a width and a length and an opening for insertion of the cartridge therein, said opening having a left end and a right end, the width of said opening being defined by the distance between said left end and said right end and being about equal to the width of said cartridge;
   (b) said cartridge having a transducer access opening for allowing entry of a transducer into the cartridge and a cartridge reference surface adjacent said transducer access opening;
   (c) a spicule member contained within said housing and mounted thereto, said spicule member having a leading edge adjacent said opening in said housing, the width of said leading edge being about the same as the width of said cartridge access opening, said spicule member having a slot running substantially in the direction of travel of the cartridge when the cartridge is inserted into said disk drive opening for engaging the cartridge reference surface and accurately positioning said cartridge in the region of said transducer, said slot having a first surface spaced from and opposed to a second surface; and
   (d) a transducer slideably mounted to said housing such that said transducer is movable substantially only in a plane parallel to the disk when the cartridge is inserted in the disk drive.

9. The disk drive as recited in claim 8 further comprising a drive spindle mounted to said spicule member such that said drive spindle is in rotational engagement the said disk when the cartridge is fully inserted into said disk drive.

10. The disk drive as recited in claim 8 further comprising clamping means for holding the cartridge reference surface against said second surface of said spicule slot.

11. The disk drive as recited in claim 10 further comprising guiding means for guiding the cartridge reference surface into said spicule slot.

12. The disk drive as recited in claim 11 wherein said clamping means comprises resilient means contained within said spicule slot for urging said cartridge reference surface into contact with said second surface of said spicule slot.

13. The disk drive as recited in claim 12 wherein said guiding means comprises said leading edge being wedge shaped for directing said cartridge reference surface into said spicule slot.

14. An improved data storage and retrieval device having: a housing having an opening therein for allowing entry of a record disk; a record disk contained in a rigid apertured cartridge; a drive spindle contained within the housing and having access to the record disk for rotating the disk in a predetermined plane of rotation; and a transducer contained within the housing and having access to the record disk for storage and retrieval of data to and from the record disk, wherein the improvement comprises:

(a) a spicule member contained within the housing and mounted to the housing, said spicule member having a slot running substantially in the direction of travel of the cartridge when the cartridge is inserted in the disk drive for guiding said cartridge into the disk drive, said slot comprising a spicule reference surface;

(b) a cartridge having a cartridge reference rail proximate to the aperture in the cartridge;

(c) said spicule member being located within said housing such that said cartridge reference rail engages said slot upon entry of said cartridge into said housing;

(d) means for holding said cartridge reference rail in contact with said spicule reference surface such that said cartridge is properly positioned within said housing; and (e) means for movably mounting said transducer to the spicule member such that said transducer is movable in a plane substantially only parallel to said plane of rotation.

15. The improved data storage and retrieval device recited in claim 14 further comprising a drive spindle mounted to said spicule member such that said drive spindle is in rotational engagement with said disk.

* * * * *